(12) United States Patent
Dietz et al.

(10) Patent No.: US 6,408,337 B1
(45) Date of Patent: Jun. 18, 2002

(54) ENGAGEMENT OF NON-EMPLOYEE WORKERS

(75) Inventors: Janice Gold Dietz, Atlanta; R. Kelly Mayo, Marietta; Daniel P. Reteneller, Atlanta, all of GA (US)

(73) Assignee: Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/312,120

(22) Filed: May 14, 1999

(Under 37 CFR 1.47)

(51) Int. Cl.⁷ .............................................. G06F 13/00

(52) U.S. Cl. ...................................................... 709/229

(58) Field of Search ............................... 705/1, 3, 7, 8, 705/9; 707/1; 709/200, 201, 203, 223, 226, 229

(56) References Cited

U.S. PATENT DOCUMENTS 5,758,324 A * 5/1998 Hartman et al. ................ 705/1
6,049,776 A * 4/2000 Donnelly et al. ............... 705/8
6,266,659 B1 * 7/2001 Nadkarni ........................ 705/3
6,311,164 B1 * 10/2001 Ogden ........................... 705/7

* cited by examiner

*Primary Examiner*—Robert B. Harrell
(74) *Attorney, Agent, or Firm*—Sutherland Asbill & Brennan LLP (57) ABSTRACT

Assisting an organization in managing the engagement of non-employee workers supplied by a vendor. The organization maintains a computer system that is linked to a vendor's computer system. Electronic communication allows for sharing of information between the organization's computer system and the vendor's computer system. A database management system is provided for accessing a database to create, modify, store and access non-employee worker profiles, requests for non-employee workers, work assignments, time reports, and possibly electronic versions of employment agreements. Electronic settlement means may transfer payments to the vendor in exchange for services rendered by the non-employee worker. An engaging manager may send an e-mail request to the vendor for a non-employee worker. The vendor may provide the engaging manager with an e-mail response listing all eligible non-employees workers. The engaging manager may then request a non-employee worker from the list and, via e-mail, seek approval from a supervisor for engaging the non-employee worker. An engaging manager may also search the non-employee worker profiles in the database in order to find a non-employee worker without sending an e-mail request to the vendor. Work assignments for non-employee workers are entered into the database. Work assignments may include a job description, an hourly billing rate, and identification information. A non-employee worker stores in the database a time report recording time worked against the work assignment. Time reports may be accessed by a time approver. Approved time is submitted to an accounts payable department, which handles payment of the vendor.

38 Claims, 5 Drawing Sheets

ENGAGEMENT OF NON-EMPLOYEE WORKERS

FIELD OF THE INVENTION

The present invention relates in general to engagement of non-employee workers. More particularly, the present invention relates to a distributed computer network configured to aid an organization in managing engagements of non-employee workers who are supplied by a vendor.

BACKGROUND OF THE INVENTION

Many organizations engage non-employee workers for the performance of temporary jobs. Non-employee workers are also commonly referred to as contract workers, temporary workers, temps, or the like. Non-employee workers are typically supplied to an organization by vendors, which are also commonly referred to as agencies or suppliers. Typically, the organization compensates the vendor for services rendered by a non-employee worker. The vendor is the employer of the non-employee worker and is responsible for compensating the non-employee worker.

The engagement of non-employee workers tends to be a paper work intensive undertaking. Records must be maintained at every level to obtain approval for engaging a non-employee worker, to record the hours worked by the non-employee worker, to approve the hours worked by the non-employee worker, and to ensure that the vendor is appropriately compensated. According to common practice, the organization maintains a set of records, the non-employee maintains a set of records, and the vendor maintains a set of records. The records maintained by each party must subsequently be reconciled to ensure that proper payments are exchanged and appropriate government reporting is accomplished. Presently, there is no desirable solution for automating the process involved in managing the engagement of non-employee workers.

When an organization engages a significant number of non-employee workers, management and accounting dilemmas are amplified. In the first instance, difficulty in keeping track of the precise skills possessed by each non-employee worker may lead to the placement of unqualified workers in certain positions. Also, from an accounting perspective, the engagement of a large number of non-employee workers may lead to cash flow problems. For example, confusion may arise as to whether a request for compensation was approved by an authorized manager. Also, duplicate requests for compensation may often be processed before the duplication is recognized. These and other problems associated with the engagement of non-employee workers are commonly known.

Thus, there remains a need for a method and system that automates the process of managing engagements of non-employee workers.

SUMMARY OF THE INVENTION

The present invention meets the need described above by providing a method and system for automating the process of managing engagements of non-employee workers. The method and system of the present invention encompasses all aspects of an organization's non-employee worker engagement, including: establishment of a contractual relationship with a vendor, requisition of a suitable non-employee worker for a particular job, creation of a work assignment with execution of job-specific agreements, approval of a work assignment, evaluation of non-employee worker services, submission of time reports by non-employee workers, approval/disapproval of time reports, compensation of vendors for services rendered by the non-employee worker, evaluation of the engagement of the non-employee worker and reporting on the engagement of the non-employee worker.

According to one aspect of the present invention, an organization maintains a computer system that is linked via a network to a computer system maintained by the vendor. Electronic communication means may be provided for communicating and sharing information between an organization's computer system and a vendor's computer system. A database is provided as a component of the organization's computer system for storing non-employee worker profiles and managing work assignments. A non-employee worker profile minimally includes the name and social security number of the non-employee worker. Optimally, a non-employee worker profile also includes detailed information about the non-employee worker, such as a resume, specific skills, prior service evaluations, hourly rates for specific tasks, availability, etc. A database management system is provided for accessing the database to create, modify, store and access non-employee worker profiles, work assignments, time reports, and possibly electronic versions of employment agreements. Electronic settlement means may also be provided for transferring payments to the vendor in exchange for services rendered by the non-employee worker. Electronic settlement means may also be used to automatically reimburse a vendor for expenses incurred by a non-employee worker during an engagement.

According to another aspect of the present invention, an engaging manager is responsible for requesting a non-employee worker who is suitable to fill a particular position. To find a suitable non-employee worker, the engaging manager may send an e-mail request to the vendor. Upon receipt of the e-mail request, the vendor may compile a list of all qualified and available non-employee workers. The vendor may then provide the engaging manager with an e-mail response listing all eligible non-employees workers. The engaging manager may then request a non-employee worker from the list and, via e-mail, seek the approval of a supervisor for engaging the non-employee worker. In another embodiment, the engaging manager may search the non-employee worker profiles in the database in order to find a suitable non-employee worker without having to send an e-mail request to the vendor.

The vendor and the organization may have an executed master contract on file prior to the organization's engagement of non-employee workers. Then, as each non-employee worker is engaged, a supplemental agreement may be electronically generated and transmitted to the vendor, via e-mail or facsimile, for execution. A supplemental agreement is meant to supplement the master contract by specifying the terms of a particular engagement. Intellectual property assignments and non-disclosure agreements may be included in supplemental agreements.

Work assignments are entered into the database by the engaging manager. Work assignments may include a job description, an hourly rate, and information identifying the non-employee worker and the vendor. Work assignments may be accessed electronically for approval by a work assignment approver. Upon approval of a work assignment, a non-employee worker is provided with access to the database in order to store a time report therein. The time report records time worked against the work assignment. Non-employee workers may be provided with local and/or remote access to the database.

Time reports may be electronically accessed by a time approver for approval or disapproval. A time approver may approve or disapprove a time report in whole or in part, or may override a portion of the time report so as to adjust the time recorded therein. Once a portion of the time report has been approved, that portion of the time report is rendered unavailable for modification by the non-employee worker. Any approved time is submitted to an accounts payable department of the organization. The accounts payable department then compensates the vendor for services rendered by the non-employee worker. Compensation of the vendor may be handled by electronic fund transfer or any other well know means.

These and other aspects, features and advantages of the present invention may be more clearly understood and appreciated from a review of the following detailed description of the exemplary embodiments and by reference to the appended drawings and claims.

DETAILED DESCRIPTION

The present invention is directed to a system and method for automating the process by which an organization manages engagements of non-employee workers. As mentioned above, non-employee workers are engaged by an organization on a temporary basis. Non-employee workers are typically supplied to an organization by a vendor or agency. The supplying vendor or agency is typically considered the employer of the non-employee worker. Also, non-employee workers may be independent contractors, who serve as their own vendors or agents. Broadly, the present invention provides a distributed computer network having various nodes for communicating and sharing information between the organization and one or more vendors.

Figure 1:
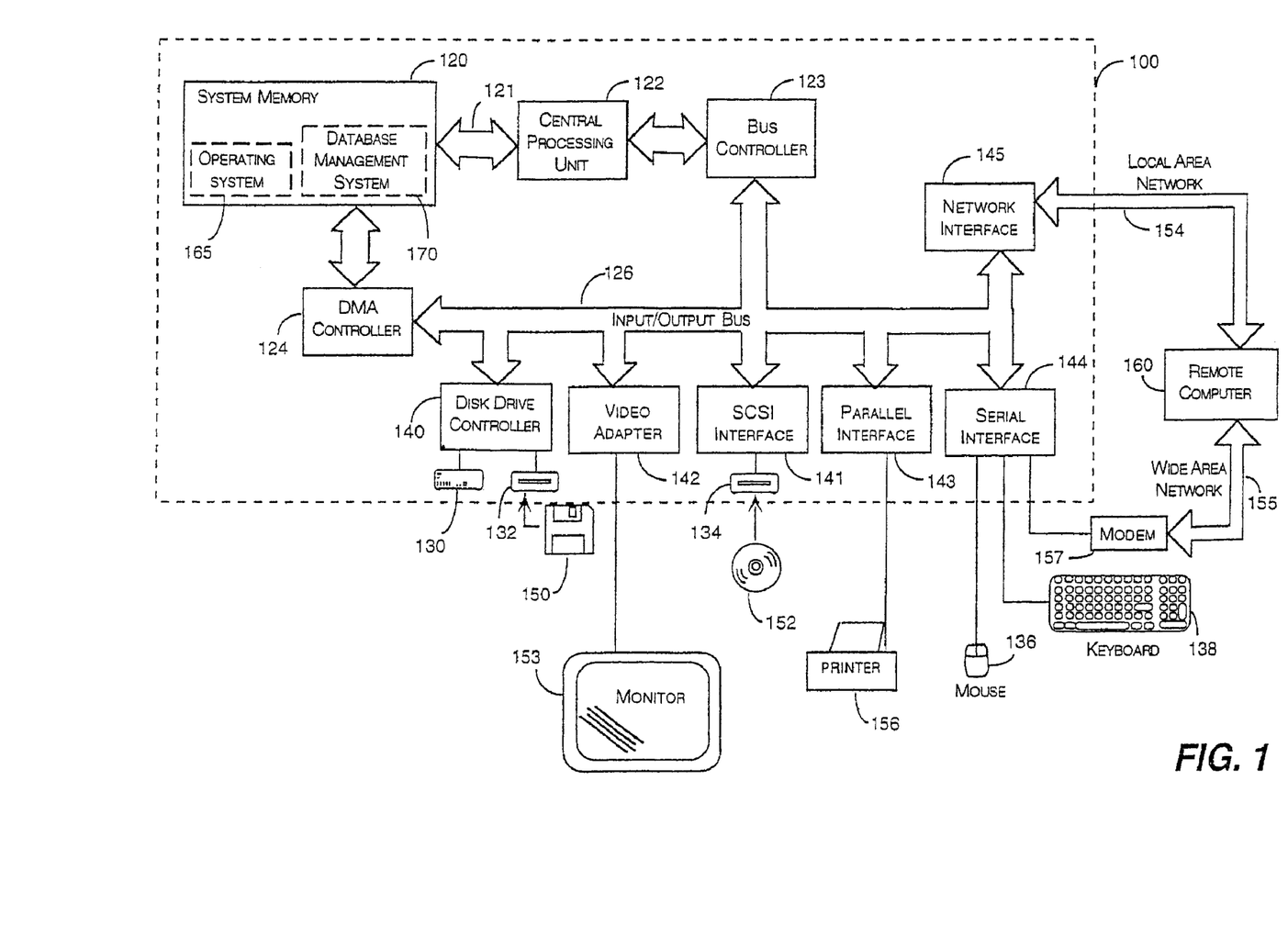
FIG. 1 is a block diagram of a personal computer illustrating the operating environment for an exemplary embodiment of the present invention.

At the core of the present invention is a database and a database management system that are used for storing and accessing non-employee worker profiles, agreements, work assignments and time reports The database management system may be configured as one or more software program modules for providing graphical user interface into the database. Exemplary software program modules will be discussed in greater detail below.
Exemplary Operating Environment The following description will hereinafter refer to the drawing, in which like numerals indicate like elements throughout the several figures. FIG. 1 and the following discussion are intended to provide a brief and general description of a suitable computing environment for implementing the present invention. Although the system shown in FIG. 1 is a conventional personal computer 100, those skilled in the art will recognize that the invention also may be implemented using other types of computer system configurations. The computer 100 includes a central processing unit 122, a system memory 120, and an Input/Output ("I/O") bus 126. A system bus 121 couples the central processing unit 122 to the system memory 120. A bus controller 123 controls the flow of data on the I/O bus 126 and between the central processing unit 122 and a variety of internal and external I/O devices. The I/O devices connected to the I/O bus 126 may have direct access to the system memory 120 using a Direct Memory Access ("DMA") controller 124.

The I/O devices are connected to the I/O bus 126 via a set of device interfaces. The device interfaces may include both hardware components and software components. For instance, a hard disk drive 130 and a floppy disk drive 132 for reading or writing removable media 150 may be connected to the I/O bus 126 through a disk drive controller 140. An optical disk drive 134 for reading or writing optical media 152 may be connected to the I/O bus 126 using a Small Computer System Interface ("SCSI") 141. The drives and their associated computer-readable media provide non-volatile storage for the computer 100. In addition to the computer-readable media described above, other types of computer-readable media may also be used, such as ZIP drives or the like.

A display device 153, such as a monitor, is connected to the I/O bus 126 via another interface, such as a video adapter 142. A parallel interface 143 connects synchronous peripheral devices, such as a laser printer 156, to the I/O bus 126. A serial interface 144 connects communication devices to the I/O bus 126. A user may enter commands and information into the computer 100 via the serial interface 144 using an input device, such as a keyboard 138, a mouse 136 or a modem 157. Other peripheral devices (not shown) may also be connected to the computer 100, such as audio input/output devices or image capture devices.

A number of software program modules may be stored on the drives and in the system memory 120. The system memory 120 can include both Random Access Memory ("RAM") and Read Only Memory ("ROM"). The software program modules control the manner in which the computer 100 functions and interacts with the user, with I/O devices or with other computers. Software program modules include routines, operating systems 165, application programs, data structures, and other software or firmware components. In an exemplary embodiment, the present invention may include one or more software program modules forming a database management system 170 stored on the drives or in the system memory 120 of the computer 100. The database management system 170 may comprise computer implemented instructions for providing a user with a graphical user interface for accessing a database (not shown) that may also be stored in the system memory 120 or in the memory of a remote computer 160.

The computer 100 may operate in a networked environment using logical connections to one or more remote computers, such as remote computer 160. The remote computer 160 may be a server, a router, a peer device or other common network node, and typically includes many or all of the elements described in connection with the computer 100. In a networked environment, program modules and data may be stored on the remote computer 160. The logical connections depicted in FIG. 1 include a local area network ("LAN") 154 and a wide area network ("WAN") 155. In a LAN environment, a network interface 145, such as an Ethernet adapter card, can be used to connect the computer 100 to the remote computer 160. In a WAN environment, the computer 100 may use a telecommunications device, such as a modem 157, to establish a connection. It will be appreciated that the network connections shown are exemplary and other means of establishing a communications link between the computers may be used.

Figure 2:
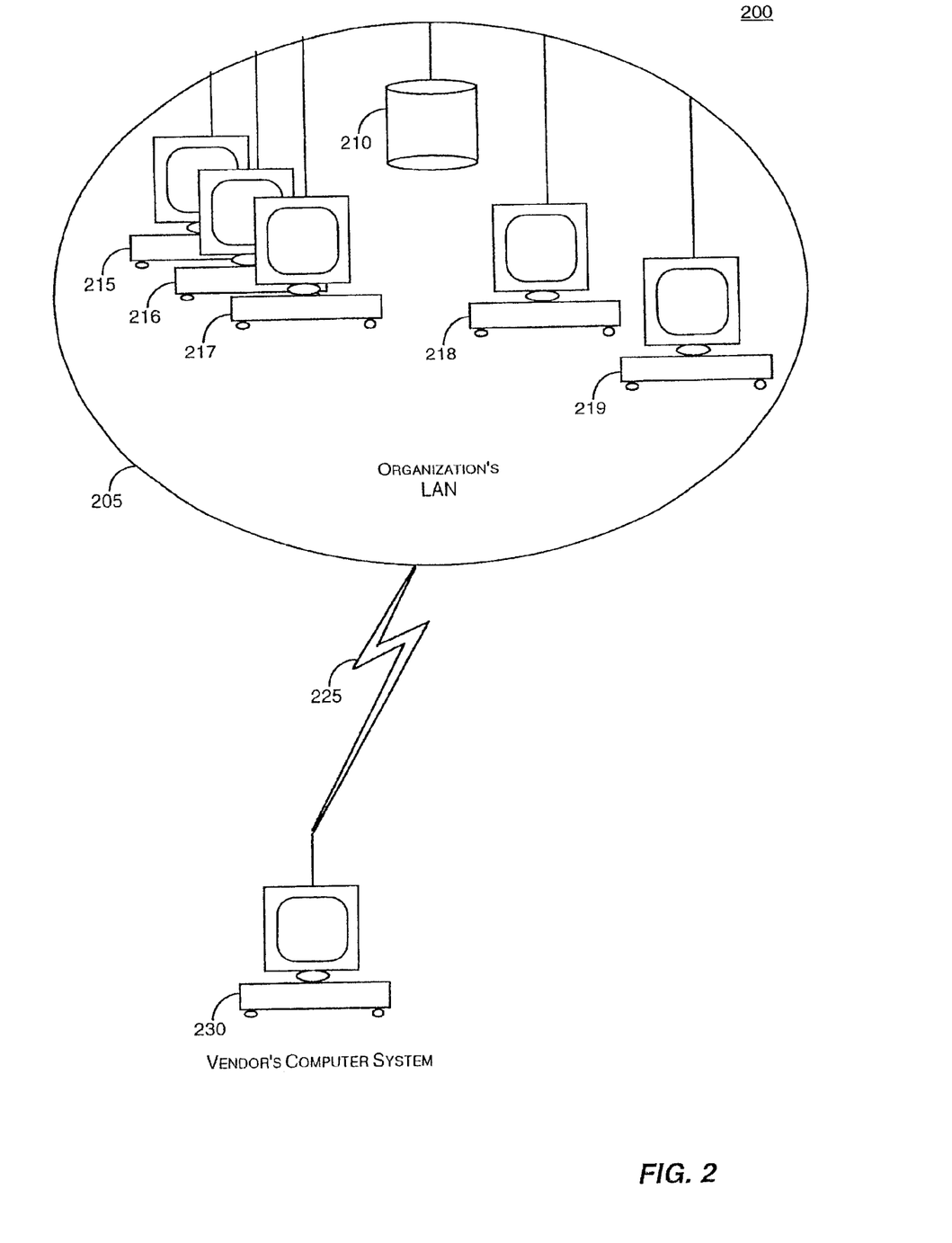
FIG. 2 is a block diagram illustrating an exemplary distributed computer network environment for an exemplary embodiment of the present invention.

FIG. 2 is a functional block diagram representing an exemplary distributed network environment for an exemplary embodiment of the present invention. As shown, an organization maintains a first distributed network, such as local area network (LAN) 205, comprising a database 210 and several workstations 215–219. Each work station 215–219 is able to access to the database 210 through a database management system (not shown). In an exemplary embodiment, the workstations 215–219 may be operated by various workers within the organization, such as engaging managers, work assignment approvers, time approvers, an accounts payable department, and non-employee workers. Those skilled in the art will appreciate that more or fewer workstations may be provided. Those skilled in the art should further appreciate that the workers within the organization may also access the organization's LAN 205 from remote workstations (not shown) to perform any of the tasks involved in managing the engagement of non-employee workers.

The organization's LAN 205 may be linked via a wide area network (WAN) 225, such as the Internet, to a computer system 230 maintained by the vendor. The vendor's computer system 230 may be a single workstation, as shown in the figure, or a LAN comprising a plurality of nodes. In the distributed network 200 environment, the organization is able to electronically communicate with the vendor in a variety of well known manners, such as e-mail, facsimile, file transfer protocols, and shared access to network resources. As an example, an engaging manager operating a workstation 215–219 of the organization's LAN 205, may send to the vendor's computer system 230 an e-mail request for a non-employee worker who is suitable to fill a particular temporary position. Upon receipt of the e-mail request, the vendor may compile a list of all qualified and available non-employee workers. The vendor may then provide the engaging manager with an e-mail response listing all eligible non-employees workers. Upon receipt of the e-mail response, the engaging manager may request a non-employee worker from the list and, via e-mail, seek the approval of a supervisor within the organization for hiring the non-employee worker. For security purposes, the organization may employ an internal e-mail system and an external e-mail system.

For the sake of simplicity, FIG. 2 shows only a single vendor's computer system 230 connected to the organization's LAN 205. However, those skilled in the art will appreciate that the present invention may be configured such that multiple vendor computer systems are connected to the organization's LAN 205. As such, an engaging manager of the organization may send an e-mail request for a non-employee worker to more than one vendor. Multiple vendors may thus compete for the opportunity to supply a non-employee worker to the organization. Furthermore, the organization may establish a hierarchy of preferred vendors, who are given priority over non-preferred vendors. In the alternative, those skilled in the art should appreciate that the present invention does not require any vendors to be in electronic communication with the organization's LAN 205.

Operation of Exemplary Embodiments

Figure 3:
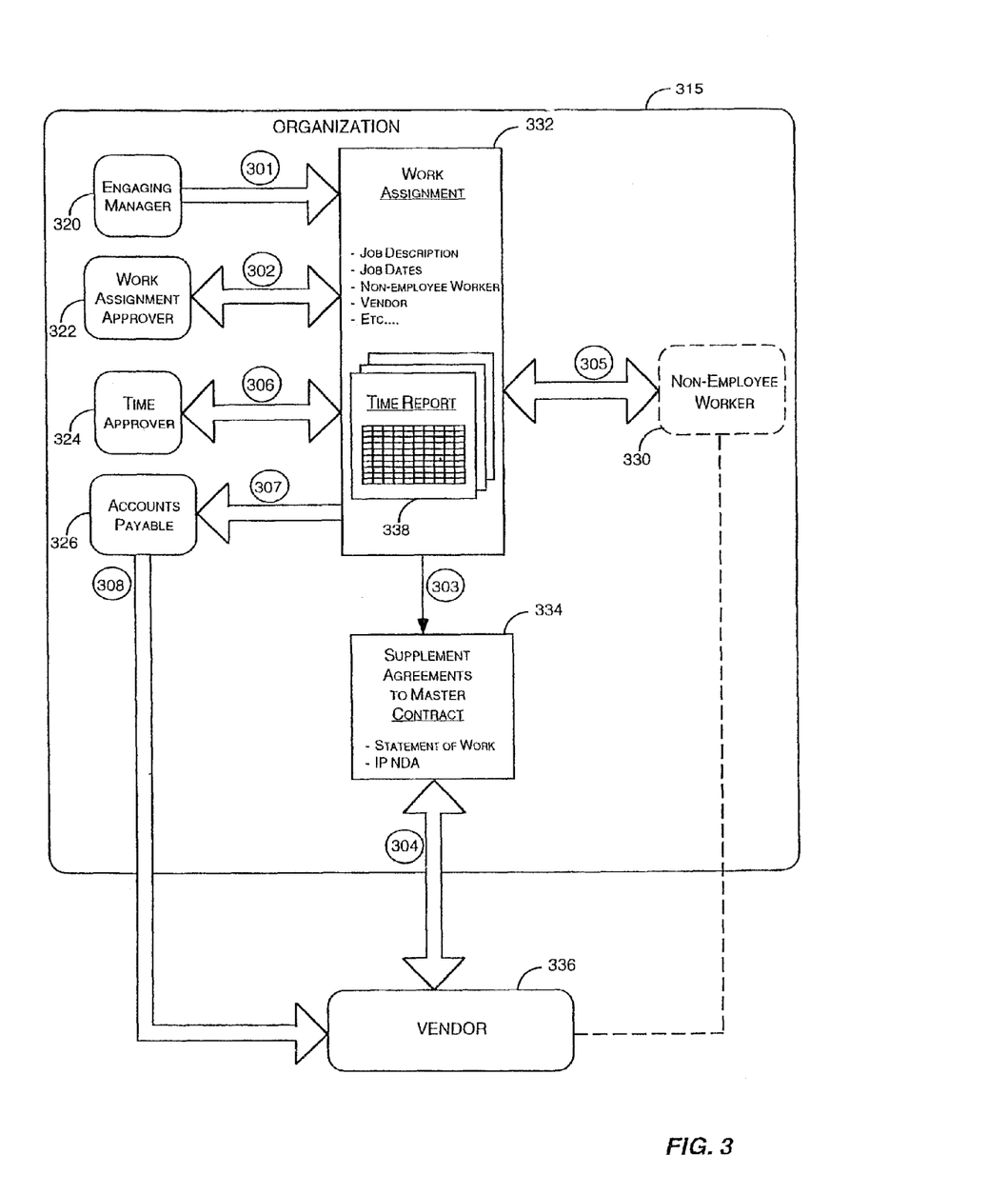
FIG. 3 is a functional block diagram illustrating operation of an exemplary embodiment of the present invention.

FIG. 3 is a functional block diagram illustrating the operation of an exemplary embodiment of the present invention. As mentioned above, several workers within an organization 315 may be involved in the implementation of the method and system of the present invention. In an exemplary embodiment, the involved workers include an engaging manager 320, a work assignment approver 322, a time approver 324, an accounts payable department 326, and a non-employee worker 330. The non-employee worker 330 is supplied to the organization 315 by a vendor 336.

The engaging manager 320 is responsible for requesting a non-employee worker 330 who is suitable for a particular temporary position within the organization. Requisition of a suitable non-employee worker will be discussed in detail below. The engaging manager 320 is also responsible for creating a work assignment 332 for the non-employee worker 330 (step 301). A work assignment 332 establishes the parameters of the non-employee worker's 330 engagement. Such parameters may include a description of the job to be performed during the engagement, a billing rate, a budget for the job, the duration of the engagement, the identity of the non-employee worker 330 and the vendor 336, etc. In an exemplary embodiment, a work assignment 332 is specific to a particular job. In other words, when a particular job is completed by a non-employee worker 330, the work assignment 332 associated therewith is closed. A new work assignment must be created before the non-employee worker 330 will be authorized to perform another task for the organization 315.

After a work assignment 332 is created and stored in the database 210 of the organization's computer system, a work assignment approver 322 may access and approve the work assignment 332 (step 302). A work assignment approver 322 is a manager or supervisor who has budgetary authorization for the area within the organization 315 in which the non-employee worker 330 will be engaged. In an exemplary embodiment, the engaging manager 320 and the work assignment approver 322 may each have access to workstations 215–219 of a LAN 205. Via the LAN 205, the engaging manager 320 may send an e-mail notification to the work assignment approver 322 indicating that the work assignment 332 has been stored in the database 210 and awaits approval. Of course, notification of the work assignment approver 322 may be accomplished by any other well known means, including, but not limited to a telephone call and/or voice-mail, a facsimile, a written memo, etc.

Prior to the engagement of a non-employee worker 330, the organization 315 and the vendor 336 may already have on file an executed master contract. A master contract governs the general relationship between the organization 315 and the vendor 336. A work assignment 332 supplements the master contract by specifying the terms of each individual engagement of a non-employee worker 330. A work assignment 332 represents the on-line approval of an engagement by the organization 315. Still, the terms of the engagement should be formally and legally memorialized and executed by both the organization 315 and the vendor 336. Therefore, after the work assignment 332 has been approved, one or more supplemental agreements 334 are generated based on the work assignment 332 (step 303). Supplemental agreements 334 may include, but are not limited to, statements of work, intellectual property assignments and non-disclosure agreements. A software program module may be provided to generate automatically supplemental agreements 334 based on information contained in a work assignment. Also, supplemental agreements may be generated manually by an engaging manager 320 or other worker of the organization 315.

Supplemental agreements 334 are sent to the vendor 336 for execution and are then returned to the organization for filing (step 304). Supplemental agreements 334 may be sent to and from the vendor 336 via facsimile or by conventional mail, etc. However, in an exemplary embodiment, supplemental agreements 334 may also be executed via e-mail with electronic signatures. Electronic signatures are well known in the pertinent art. Supplemental agreements 334 returned to the organization 315 may be filed in soft copy in the database 210 and/or in hardcopy in conventional paper filing systems.

When all supplemental agreements 334 have been executed and filed with the organization 315, the non-employee worker 330 is provided with access to the database 210 in order to enter time against the work assignment 332 (step 305). In an exemplary embodiment, a time entry software program module forming a component of the database management system 170 is provided on a workstation 215–219 connected to the organization's LAN 205. The time entry software provides a graphical user interface for accessing a portion of the database 210 where time reports 338 are stored. Time reports 338, sometime referred to as time slips or time sheets, may be created through pre-configured electronic forms containing fields for the input of data representing time worked by a non-employee worker 330. For security purposes, the time entry software may be password protected and may not provide access areas of the database 210 where work assignments 332 and other administrative information are stored. Accordingly, a non-employee worker 322 may access the database 210 through a local workstation 215–219 to record time worked against a work assignment 332 (step 305).

Non-employee workers 330 may also be provided with remote access to the database 210 for the purpose of time entry, as well as other tasks. For example, a time entry software program module may be run a remote and/or portable device, such as a remote workstation, a laptop computer, a digital telephone, a pager, etc. As will be apparent to those of ordinary skill in the art, remote and/or portable devices may interface with the organization's LAN 205 via a modem, an Ethernet connection, or other well known communication means.

In an exemplary embodiment, a time report 338 is accessed by a time approver 324 (step 306) when a non-employee worker 330 marks the time report 338 as "ready for approval." An e-mail or other type of message may be used to alert the time approver 324 that a time report 338 is ready for approval. Approval for a time report 338 must be obtained before compensation may be made to a vendor 336. A time approver 324 may be any duly authorized worker of the organization. The time approver 324 may be provided with the authority to approve or reject a time report 338, in part or in total. A time approver 324 may also override or modify a portion of the time report 338.

Once a time report has been approved by a time approver 324, the time report 338 is transmitted to an accounts payable department 326 (step 307). The accounts payable department 326 may deliver compensation to the vendor 336 through electronic fund transfer or any other well know means (step 308). Accordingly, the vendor 336 is automatically compensated without the need to maintain records and/or invoice the organization for services rendered by the non-employee worker 330. Of course, the accounts payable department 326 only compensates the vendor 336 for approved time worked by the non-employee worker 330., Thus, the accounts payable department 326 may also send to the vendor 336 a summary (via e-mail or facsimile) of the time report 338 indicating approved and disapproved time. In an exemplary embodiment, the vendor 336 is charged with the responsibility for contacting the organization 315 (preferably the engaging manager 320) to dispute compensation discrepancies.

In another embodiment, compensation rendered by the organization may based on other factors or events, aside from time worked by a non-employee worker. For example, a trigger may be built into the system such that approval for compensation is automatically requested based on completion of a deliverable. Alternately, a trigger generating a request for approval of compensation may be date dependant. Accordingly, the present invention may be configured to handle the engagement of non-employee workers who are not necessarily compensated based on an hourly rate.

Although not shown in FIG. 3, an exemplary embodiment of the present invention also provides for the automatic reimbursement of expenses incurred by the non-employee worker 330 during an engagement. In common practice, the vendor 336 reimburses the non-employee worker 330 for out-of pocket expenses, such as travel expenses, etc. The vendor 336 must then collect the reimbursed expenses from the organization 315. The present invention may be configured in such a manner as to allow the non-employee worker 330 to record reimbursable expenses in the time report 338. Then, when the time report 338 is accessed by the time approver 324 (step 306), reimbursement of the expenses may be approved or disapproved. Compensation for approved expenses may subsequently be transmitted to the vendor 336 from the accounts payable department 326 (step 308).

Figure 4A:
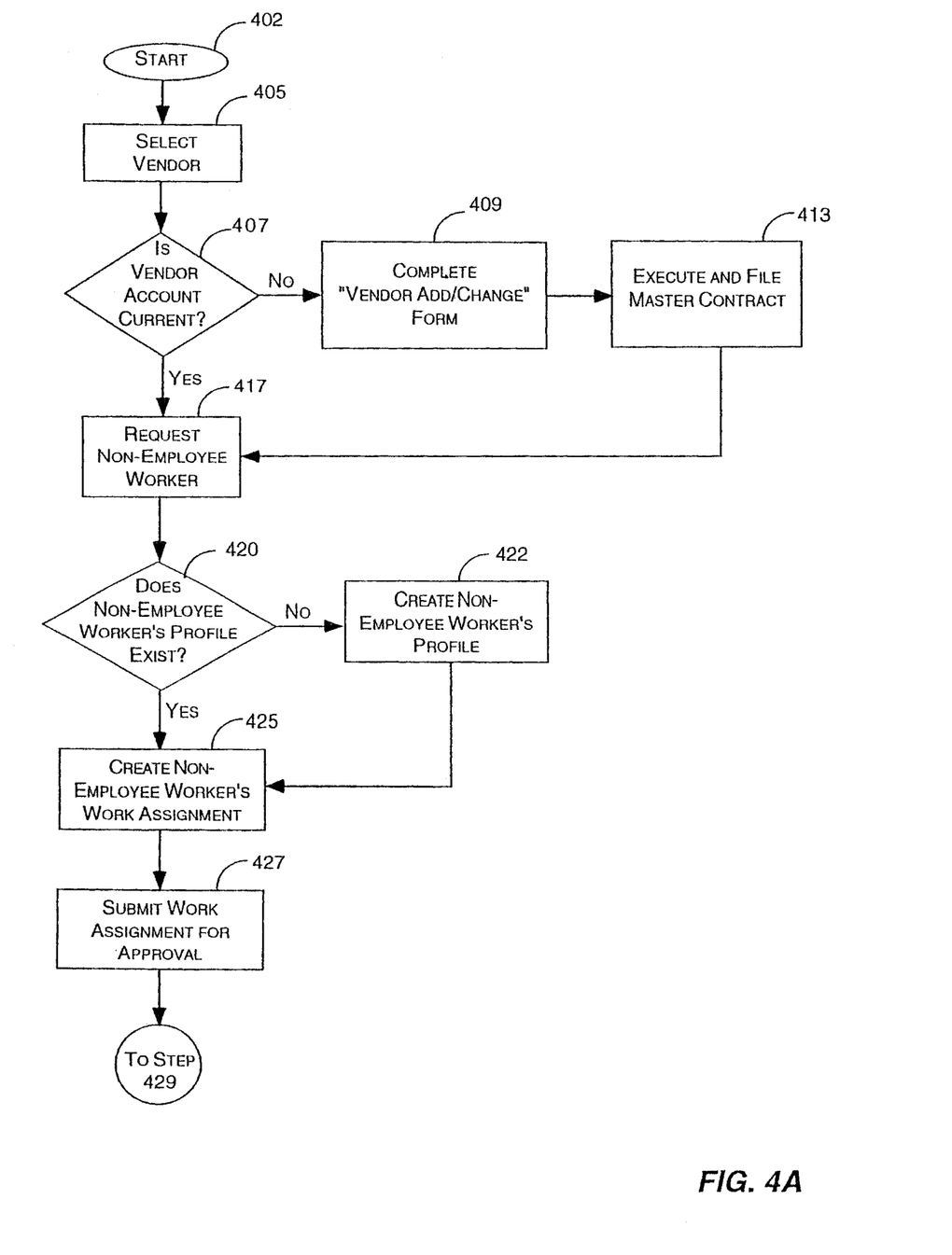
FIG. 4A is a flow diagram illustrating operation of an exemplary method of the present invention.

FIG. 4 is a flow chart describing the steps involved in carrying out an exemplary method 400 of the present invention. The exemplary method proceeds from starting block 402 to step 405, where a vendor of non-employee workers is selected. The present invention may be configured to allow accounts for preferred vendors. Setting up an account may involve the assignment of a vendor number for accounting purposes and the execution of a master contract governing the relationship between the organization and the vendor. Thus, an engaging manager may select a vendor from a list of preferred vendors or may set up an account for a new vendor.

Accordingly, at step 407 it is determined whether the desired vendor has an existing or current account. If the vendor account is not current or does not exist, the account must be updated or created. In this event, the method proceeds to step 409, where a "vendor add/change form" is completed. Preferably, the "vendor add/change form" is completed by the vendor, either via e-mail or facsimile, and submitted to the organization. Next, at step 413, the vendor and the organization execute and file a master contract that governs the relationship between the parties. The master contract sets out the terms for supplying, engaging, managing, and paying for non-employee workers.

When it is determined that the vendor account is current, the method proceeds to step 417, where a non-employee worker of the selected vendor is chosen. The requisition of the non-employee worker may be handled in several ways, depending on the configuration of the present invention. In one embodiment, the engaging manager of the organization may submit a request to the vendor for a non-employee worker. The request may specify a job category, a job description, a number of skills that are required of the non-employee worker to fill a particular position, a rate range, etc. Exception fields for specifying the reasons why certain standards are not followed may also be built into a request for a non-employee worker. For example, a rate exception may specify that a non-employee worker will be paid more than a normal rate for a particular engagement due to special circumstances. Similarly, a vendor exception may specify the reason why a non-preferred vendor was selected to supply a non-employee worker. In response to the request, the vendor may compile a list of qualified and available non-employee workers. The engaging manager may then request a suitable non-employee worker from the list.

In another embodiment, the vendor may supply the organization with detailed profiles of each non-employee worker that it may supply to the organization. Such non-employee worker profiles may include a name and social security number of the non-employee worker, a resume, a detailed list of skills possessed by a non-employee worker, a list of hourly billing rates associated with particular skill sets, historical evaluations of the non-employee worker from prior engagements, the availability of the non-employee worker, etc. Preferably, non-employee worker profiles are electronically transmitted from the vendor to the organization and are maintained in the database 210 of the organization's computer system. Accordingly, the engaging manager may use the database management system 170 to perform a query for a suitable non-employee worker. The query may involve the specification of one or more skills that are necessary for a particular position and the billing rate that will be paid to the vendor for engagement of the non-employee worker. In response to the query, the database management system 170 may access the database 210 and return the profiles of one or more qualified and available non-employee workers to the engaging manager, who then requests a suitable non-employee worker.

In any event, a non-employee worker profile should be maintained in the organization's database for each non-employee worker engaged by the organization. At a minimum, a non-employee worker profile should include the name and social security number (for tracking purposes only) of the non-employee worker. Optimally, a non-employee worker profile includes the detailed information described in the preceding paragraph. The more information that is maintained in a non-employee worker profile, the more efficiently the organization will be able to manage its non-employee worker engagements. Thus, after a non-employee worker is requested at step 417, a check is made at step 420 to ensure that a corresponding non-employee worker profile exists in the organization's database 210. Obviously, if the non-employee worker was requested from the organization's database, a profile will exist and the method will continue to step 425. However, if the request for a non-employee worker was sent to the vendor, a profile may not yet exist in the database 210. In that event, the method proceeds to step 422, where a non-employee worker profile is created and stored in the database. The non-employee worker profile may be created by the engaging manager or by the vendor.

Next, at step 425, a work assignment is created for the non-employee worker. As mentioned, the work assignment specifies the terms of the engagement of the non-employee worker. Work assignments typically include a job category, a job description, a list of required skills, billing rates, etc. Also, it should be noted that a work assignment may be created by an engaging manager, at least partially, prior to the engagement of a non-employee worker if some of the details of the engagement are known. Then, upon engagement of the non-employee worker, the work assignment may be modified or completed to include the identity of the non-employee worker. In the alternative, the engaging manager may not create the work assignment until all information relating to the engagement is known. In yet another embodiment, a work assignment may be created by a vendor. For example, an engaging manager may submit a detailed request for a non-employee worker to the vendor. The vendor may then creates the work assignment by filling the request with an appropriate non-employee worker and transmitting the filled request back to the organization.

Those skilled in the art should recognize that in some instances, engagement of a non-employee worker may require a greater billing rate than the organization is typically willing to pay for a particular job. Therefore, a rate exception field may be built into the work assignment to record the engaging manager's justification for accepting the higher rate. Other appropriate exception fields may also be included in a work assignment.

When the work assignment is completed, it is submitted for approval at step 427. As described above, the work assignment may be transmitted to a work assignment approver, via e-mail, facsimile, memo, or the like. Also, the work assignment may be simply stored in the database and the work assignment approver may be notified (via e-mail or telephone, etc.) that the work assignment is ready for approval. At step 429, a determination is made as to whether the work assignment has been approved. In an exemplary embodiment, the present invention may be configured for automatic approvals if certain preconditions are satisfied. For example, automatic approval for an engagement may be triggered if the budget for the engagement is less then $5,000.00.

Figure 4B:
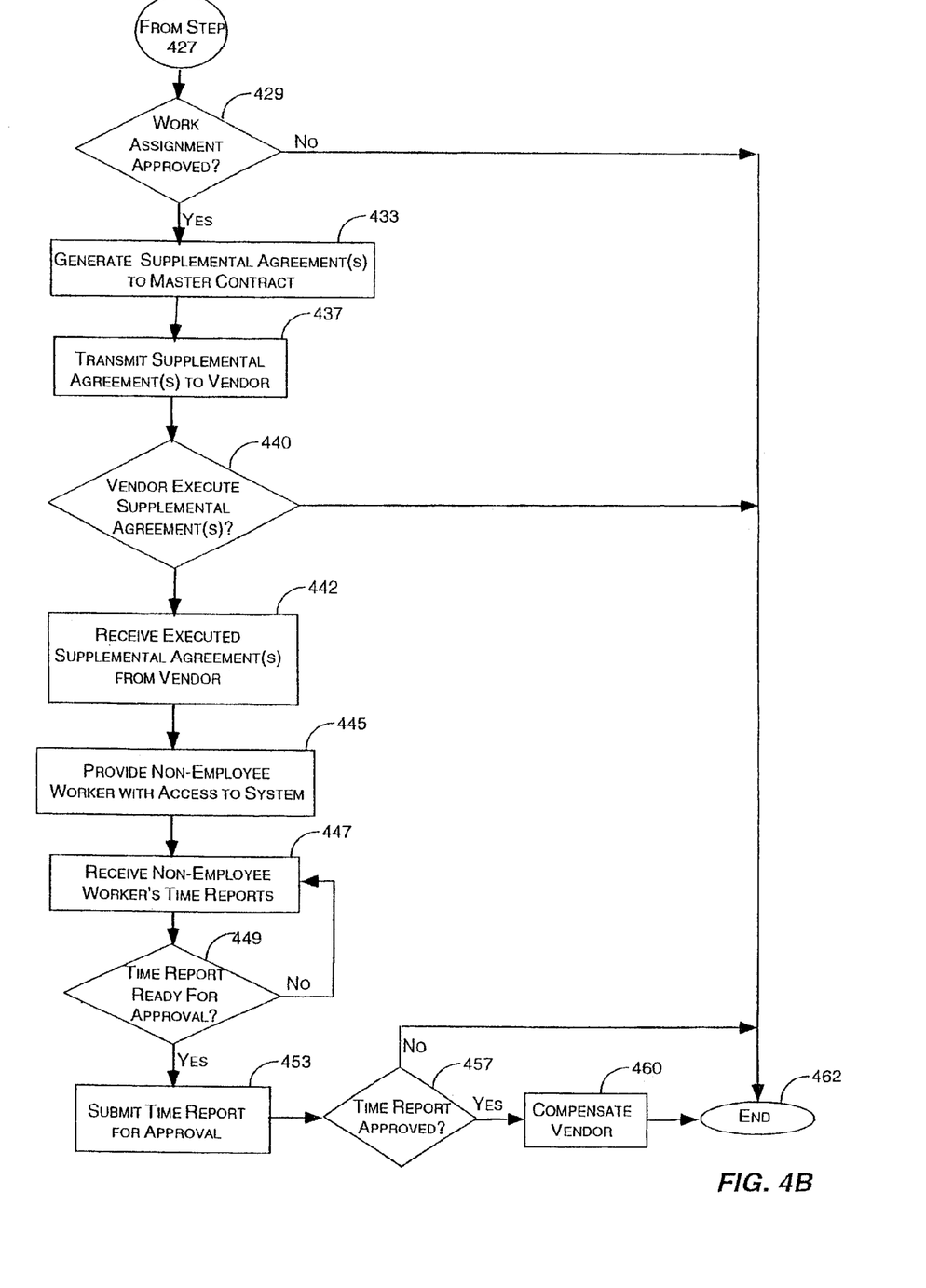
FIG. 4B is a continuation of the flow diagram of FIG. 4A.

If the work assignment has not been approved, i.e. it has been disapproved, the exemplary method ends at ending block 462. In an exemplary embodiment, the work assignment approver may insert a comment into an appropriate field of a disapproved work assignment, indicating reasons for the disapproval. The disapproved work assignment may thus be stored in the database 210 for access and review by the engaging manager 320. However, if the work assignment has been approved, the method continues to step 430, where supplemental agreements are generated.

Again, supplemental agreements memorialize the terms of the work assignment and may include other agreements, such as intellectual property assignments and non-disclosure agreements. Supplemental agreements are intended to supplement the master contract between the vendor and the organization. At step 437, the supplemental agreements are transmitted to the vendor for execution, via e-mail, facsimile, or the like. Also, one or more of the supplemental agreements may require the signature of the non-employee worker. In an exemplary embodiment, the vendor is responsible for obtaining any necessary signatures from the non-employee worker. However, in an alternate embodiment, the relevant supplemental agreements may be transmitted directly to the non-employee worker (via facsimile, e-mail or the like) for execution.

The organization then receives executed supplemental agreements from the vendor (and possibly the non-employee worker) at step 442. Again, the executed supplemental agreements may be received in hardcopy for filing in a conventional paper filing system, or may be received in softcopy with electronic signatures for filing in the database 210. When all supplemental agreements are received, the non-employee worker is provided with access to the organization's computer system. In an exemplary embodiment, the non-employee worker is provided with only limited access to a portion of the database 210 where time reports may be stored. In this way, the non-employee worker will only be able to enter or modify time reports and will not be able to access any other information stored in the database. Providing access to the system may involve providing a username and password to the non-employee worker. Along the same lines, the non-employee worker may also need to be cleared through a security department in order to gain physical access to the facilities of the organization. In response to an approved work assignment, a security clearance request may be sent to a security department so that any necessary security badges may be prepared for the non-employee worker prior to the first day of the engagement. Security clearance request messages may be transmitted via e-mail if the security department also has access to the organization's LAN 205.

After the non-employee worker is provided with access to the organization's computer system, time reports are received by the database 210 at step 447. The non-employee worker may be provided with access to a time entry software program module via a workstation 215–219. The time entry software may present pre-configured forms having fields for accepting input data representing time worked by the non-employee worker. In an exemplary embodiment, a time report is submitted for approval by a time approver when the employee marks it as "ready for approval." Therefore, if the time report has not been marked ready for approval at step 449, the method returns to step 447 where the time report may be updated or otherwise modified. When the time report is determined at step 449 to be ready for approval, it is submitted to a time approver at step 453.

A time approver may approve the time report in whole or in part. A time approver may also override the time report so as to adjust the time entries. Accordingly, if it is determined at step 457 that the time report has not been at least partially approved, the exemplary method is terminated at step 462 and no compensation is paid to the vendor. However, if the time report is at least partially approved, the vendor is compensated for the approved time at step 460. Of course, if a time report is only partially approved, the non-employee worker may be allowed to access and modify any unapproved portions thereof. Still, the non-employee worker should be prevented from modifying any part of the time report that has previously been approved. As mentioned above, compensation of the vendor may involve an electronic transfer of funds from an accounts payable department or the equivalent thereof. Compensation of the vendor may also be accomplished according to any accepted practices in the pertinent industry.

In summary, the present invention is directed toward a system and method for assisting an organization in managing engagements of non-employee workers. Additional aspects and alternative embodiments will become apparent to those having ordinary skill in the art to which the present invention pertains. For example, the detailed information stored in the database relating to non-employee workers and work assignments is conducive to detailed reporting schemes, whereby the organization may generate and maintain various records pertaining to the engagement of non-employee worker. As such, the database management system of the present invention may be configured for extracting information from the database and generating reports. Also, an add-on program module may be provided to the system of the present invention for accomplishing desired reporting functions. These and additional aspects and alternate embodiments are considered to be encompassed within the spirit and scope of the present invention. Accordingly, the scope of the present invention is described by the appended claims and is supported by the foregoing description.

What is claimed is:

1. A method for use by an organization for managing an engagement of a non-employee worker supplied by a vendor, the method comprising the steps of:

requesting the non-employee worker from a database of non-employee workers;

storing a work assignment for the non-employee worker in a database;

electronically communicating with the vendor to verify the engagement of the non-employee worker;

upon verification of the engagement, providing the non-employee worker with access to the database so that the non-employee worker may enter therein a time report associated with the work assignment;

accessing the database to approve the time report; and upon approval of the time report, compensating the vendor for services rendered by the non-employee worker.

2. The method of claim 1, wherein the database comprises a non-employee worker profile for each of a plurality of non-employee workers supplied by at least the vendor; and wherein the non-employee worker profile comprises a name and a unique identification number.

3. The method of claim 2, wherein the non-employee worker profile further comprises a detailed list of skills.

4. The method of claim 3, wherein the profile further comprises a billing rate that is related to the detailed list of skills.

5. The method of claim 4, wherein requesting the non-employee worker from the database is performed based on the billing rate and the detailed list of skills.

6. The method of claim 2, wherein the non-employee worker profile further comprises a resume.

7. The method of claim 2, wherein the non-employee worker profile further comprises at least one prior evaluation relating to past engagements.

8. The method of claim 1, wherein the organization and the vendor have a previously executed master agreement on file; and wherein the method further comprises the step of transmitting a supplemental agreement to the vendor to memorialize one or more terms of the engagement of the non-employee worker.

9. The method of claim 8, wherein the step of electronically transmitting the supplemental agreement is accomplished via facsimile.

10. The method of claim 8, wherein the step of electronically transmitting the supplemental agreement is accomplished via e-mail.

11. The method of claim 8, further comprising the step of receiving an executed copy of the supplemental agreement from the vendor prior to providing the non-employee worker with access to the database.

12. The method of claim 8, wherein the supplemental agreement is an intellectual property assignment or non-disclosure agreement.

13. The method of claim 1, further comprising the steps of receiving an indication that the engagement has been completed; and in response to receiving the indication, closing the work assignment such that the time report is unable to be modified by the non-employee worker.

14. The method of claim 13, wherein the indication that the engagement has been completed is provided by the non-employee worker in the time report.

15. The method of claim 13, wherein the indication that the engagement has been completed is provided by a manager of the organization.

16. The method of claim 1, wherein the step of electronically communicating with the vendor is accomplished via e-mail.

17. The method of claim 1, further comprising the step of prior to storing the work assignment in the database, electronically communicating with a manager of the organization to obtain approval for the work assignment.

18. The method of claim 1, wherein the step of compensating the vendor comprises electronically transferring funds to an account maintained by the vendor.

19. The method of claim 1, wherein the step of accessing the database to approve the time report is performed at a time interval agreed to by the organization and the vendor.

20. The method of claim 1, further comprising the step of storing an evaluation of the engagement of the non-employee worker in the database.

21. The method of claim 1, wherein the time report lists both time billed and expenses incurred by the non-employee worker during the engagement; and
wherein the method further comprises the step of upon approval of the time report, reimbursing the vendor for the expenses incurred by the non-employee worker.

22. The method of claim 1, wherein the vendor is provided with at least partial access to the database; and
wherein the vendor stores in the database a profile for each non-employee worker supplied by the vendor.

23. The method of claim 1, wherein the work assignment comprises a start date for the engagement, an end date for the engagement, a task description, and a billing rate.

24. The method of claim 1, wherein the step of requesting the non-employee worker from the database of non-employee workers comprises:
submitting a query to a database management system, the query comprising a list of attributes for the non-employee worker;
in response to the query, receiving from the database management system a list of eligible non-employee workers; and
requesting the non-employee worker from the list of eligible non-employee workers.

25. The method of claim 1, wherein the step of requesting a non-employee worker from the database of non-employee workers comprises:
submitting a request to the vendor, the request comprising a list of attributes for the non-employee worker;
in response to the request, receiving from the vendor a list of eligible non-employee workers; and
requesting the non-employee worker from the list of eligible non-employee workers.

26. A system for assisting an organization in managing an engagement of a non-employee worker supplied by a vendor, the system comprising:
an organization computer system comprising a database and at least one workstation;
a vendor computer system linked to the organization computer system via a network;
electronic communication means for transmitting information across the network between the organization computer system and the vendor computer system; and
a database management system running on the at least one workstation, the database management system comprising computer executable instructions for:
allowing an engaging manager to store a work assignment for the non-employee worker in the database,
allowing a work assignment approver to access and approve the work assignment,
allowing the engaging manager to request a suitable non-employee worker from the database, the database storing data for a plurality of non-employee workers supplied by the vendor,
allowing the non-employee worker to store a time report in the database, and
allowing a time approver to access and approve the time report.

27. The system of claim 26, wherein a previously executed master agreement between the organization and the vendor is stored in the database; and
wherein the electronic communication means may be used to transmit a supplemental agreement to the vendor to memorialize one or more terms of the work assignment.

28. The system of claim 27, wherein the electronic communication means comprise a sending facsimile machine functionally linked to a receiving facsimile machine.

29. The system of claim 27, wherein the electronic communication means comprise an e-mail system.

30. The system of claim 27, wherein the database management system further comprises computer executable instructions for ensuring that an executed copy of the supplemental agreement is received from the vendor prior to allowing the non-employee worker to store a time report in the database.

31. The system of claim 27, wherein the supplemental agreement comprises an intellectual property assignment or non-disclosure agreement.

32. The system of claim 26, wherein the electronic communication means comprise and e-mail system.

33. The system of claim 26, further comprising an internal e-mail system for allowing the engaging manager, the work assignment approver, and the time approver to communicate with each other regarding the engagement of the non-employee worker.

34. The system of claim 26, further comprising electronic funds transfer means for transferring funds to an account maintained by the vendor in response to approving the time report.

35. The system of claim 26, wherein the database management system comprises further computer executable instructions for allowing the engaging manager to store an evaluation of the engagement of the non-employee worker in the database.

36. The system of claim 26, wherein the time report lists both time billed and expenses incurred by the non-employee worker; and
wherein the system further comprises electronic funds transfer means for transferring funds to an account maintained by the vendor, in response to approval of the time report, as reimbursement for the expenses incurred by the non-employee worker.

37. The system of claim 26, wherein the database management system further comprises computer executable instructions for closing the work assignment in response to approval of the work assignment, such that the time report is unable to be modified by the non-employee worker.

38. A method for use by an organization for managing an engagement of a non-employee worker supplied by a vendor, the method comprising the steps of:
requesting the non-employee worker from a database of non-employee workers;
electronically communicating with the vendor to verify the requisition of the non-employee worker;
upon verification of the requisition, providing the non-employee worker with access to the database so that the non-employee worker may enter therein a time report;
accessing the database to approve the time report; and
upon approval of the time report, compensating the vendor for services rendered by the non-employee worker.

* * * * *

UNITED STATES PATENT AND TRADEMARK OFFICE
CERTIFICATE OF CORRECTION

PATENT NO.    : 6,408,337 B1  Page 1 of 1
DATED         : June 18, 2002
INVENTOR(S)   : Janice Gold Dietz, R. Kelly Mayo and Daniel P. Reteneller It is certified that error appears in the above-identified patent and that said Letters Patent is hereby corrected as shown below:

<u>Column 12,</u>
Line 2, please delete "a" and insert -- the -- in place thereof.

Signed and Sealed this

Seventeenth Day of December, 2002

JAMES E. ROGAN
*Director of the United States Patent and Trademark Office*